US007500418B2

(12) United States Patent

Wolterman

(10) Patent No.: US 7,500,418 B2

(45) Date of Patent: Mar. 10, 2009

(54) TORQUE SETTING LUG NUT WRENCH

(75) Inventor: Michael John Wolterman, Brighton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/750,392

(22) Filed: May 18, 2007

(65) Prior Publication Data

US 2008/0282810 A1 Nov. 20, 2008

(51) Int. Cl.

*B25B 13/06* (2006.01)
*B25B 23/142* (2006.01)
*G01L 5/24* (2006.01)

(52) U.S. Cl. .......................... 81/58.1; 81/58; 73/862.23

(58) Field of Classification Search ............. 73/862.23; 81/52–76

See application file for complete search history.

(56) References Cited

U.S. PATENT DOCUMENTS

| | | | | |
|---|---|---|---|---|
| 1,860,871 | A | 5/1932 | Pouliot | |
| 2,553,311 | A * | 5/1951 | Greer | 81/477 |
| 2,682,796 | A * | 7/1954 | Larson | 81/479 |
| 3,076,362 | A * | 2/1963 | Able | 81/478 |
| 3,142,177 | A * | 7/1964 | Hanscom et al. | 73/862.23 |
| 3,304,771 | A * | 2/1967 | Ochs | 73/862.23 |
| 3,703,827 | A * | 11/1972 | Cole | 73/862.23 |
| 3,772,942 | A | 11/1973 | Grabovac | |
| 3,872,527 | A | 3/1975 | Tregoning | |
| 3,967,513 | A * | 7/1976 | Myrdal | 81/477 |
| 4,314,490 | A * | 2/1982 | Stone | 81/479 |
| 4,488,442 | A * | 12/1984 | Pacinelli | 73/862.21 |
| 4,664,001 | A * | 5/1987 | Denman | 81/479 |
| 4,827,813 | A * | 5/1989 | Ruland | 81/477 |
| 4,838,134 | A * | 6/1989 | Ruland | 81/467 |
| 5,469,764 | A | 11/1995 | Lang | |
| 5,921,157 | A * | 7/1999 | Smith et al. | 81/58.1 |
| 6,070,506 | A * | 6/2000 | Becker | 81/479 |
| 6,499,358 | B1 | 12/2002 | Hogan et al. | |
| 6,945,144 | B1 | 9/2005 | Cutler et al. | |
| 7,182,147 | B2 * | 2/2007 | Cutler et al. | 173/1 |
| 2007/0068277 | A1 * | 3/2007 | Hammond et al. | 73/856 |

* cited by examiner

*Primary Examiner*—Harshad Patel
*Assistant Examiner*—Jonathan Dunlap
(74) *Attorney, Agent, or Firm*—Gifford, Krass, Sprinkle, Anderson & Citkowski, P.C.

(57) ABSTRACT

A torque setting lug nut wrench is provided. The torque setting lug nut wrench has a socket dimensioned to fit onto a lug nut of a motor vehicle wheel, a first section extending collinearly from the socket and a second section projecting from the first section. The second section, when grasped by a user, can apply a rotational force on a lug nut within the socket. A torque detection mechanism having a preset torque limit is included and provides a signal to the user applying the rotational force to the lug nut. In an embodiment of the present invention the torque detection mechanism has a single torque setting. In another embodiment, the torque detection mechanism has two torque settings.

14 Claims, 3 Drawing Sheets

TORQUE SETTING LUG NUT WRENCH

FIELD OF THE INVENTION

This invention relates generally to a lug nut wrench. More specifically, the invention relates to a torque setting lug nut wrench.

BACKGROUND OF THE INVENTION

A lug nut wrench, also known as a lug wrench, is a type of socket wrench used to turn lug nuts on automobile wheels. A typical lug wrench is an L-shaped metal rod with a socket wrench on the bent end and optionally a prying tip on the other end. The prying tip is mainly intended to remove hubcaps or wheel covers that may be covering a wheel's lug nuts.

Ideally, lug nuts on a motor vehicle wheel should be tightened with a torque wrench. However, currently available lug wrenches do not include the capability of providing a known amount of torque to a lug nut being tightened onto a motor vehicle wheel and installing a wheel with a lug wrench requires guessing about the proper tightness of the lug nut. Excessive force can strip threads or make the nuts very difficult to remove and uneven torque applied to the various lug nuts on a motor vehicle wheel, or excessive torque, can lead to warping of a brake rotor if the ear is equipped with disc brakes. Therefore, there is a need for a lug nut wrench that allows a user to apply a preset known amount of torque to a lug nut being tightened on a motor vehicle wheel.

SUMMARY OF THE INVENTION

A torque setting lug nut wrench is provided. The torque setting lug nut wrench has a socket dimensioned to fit onto a lug nut of a motor vehicle wheel, a first section extending collinearly from the socket and a second section projecting from the first section. The second section, when grasped by a user, can apply a rotational force on a lug nut within the socket. A torque detection mechanism having a preset torque limit is included and provides a signal to the user applying the rotational force to the lug nut. In an embodiment of the present invention, the torque detection mechanism has a torque setting. In another embodiment, the torque detection mechanism has two torque settings.

The torque detection mechanism can have a torque indicating lever projecting from the first section in a generally parallel direction with the second section. The torque indicating lever can extend at least partially through a lever binding mechanism. The lever binding mechanism can have a ball detent and a tension spring, the combination of which applies a binding force onto the torque indicating lever. In one example, the binding force on the torque indicating lever holds the lever stationary until between 110 and 140 newton-meters of torque is applied to a lug nut, at which point the lever escapes from the ball detent and signals the user that the preset torque limit has been reached. In a second example, the preset torque limit is between 190 and 240 newton-meters.

DETAILED DESCRIPTION OF THE PREFERRED EMBODIMENTS

The present invention comprises a simple to use torque setting lug nut wrench that can be used to tighten lug nuts on a motor vehicle wheel to a preset torque limit. As such, the present invention has utility as a lug nut wrench used to apply the proper amount of torque to a lug nut.

The torque setting lug nut wrench of the present invention is a multi-component article comprised of a socket dimensioned to fit a lug nut of an automobile wheel, a first section extending collinearly from the socket, and a second section extending at an angle from the first section. In addition, a torque indicating mechanism is included which provides a signal to a user when a preset amount of torque has been applied to a lug nut that is being tightened onto an automobile wheel.

Figure 1:
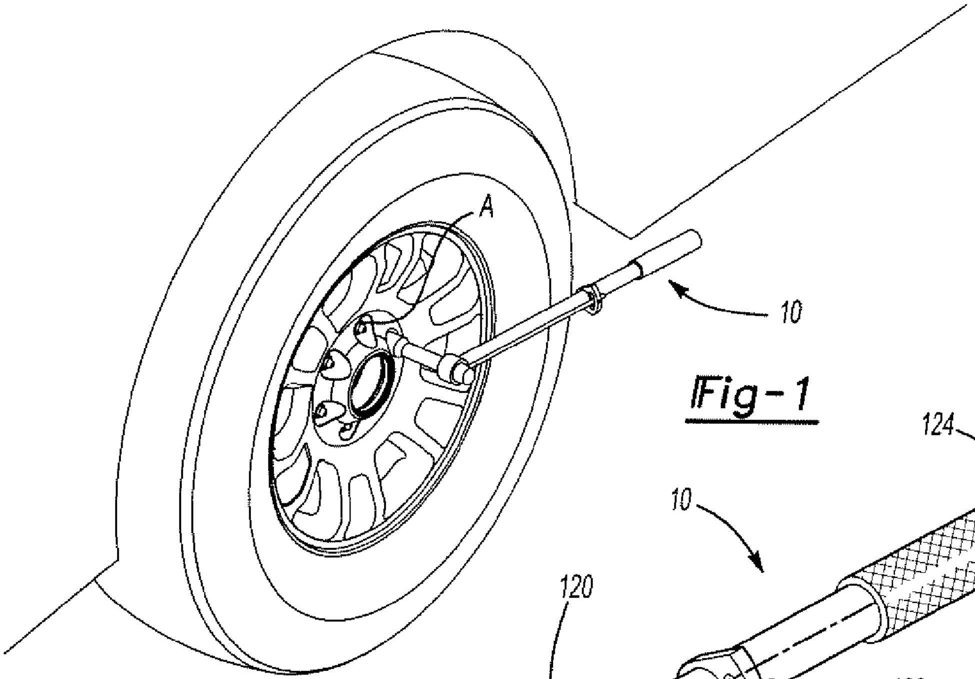
FIG. 1 is a perspective view of an embodiment of the present invention located on a lug nut of a motor vehicle wheel.
Figure 2:
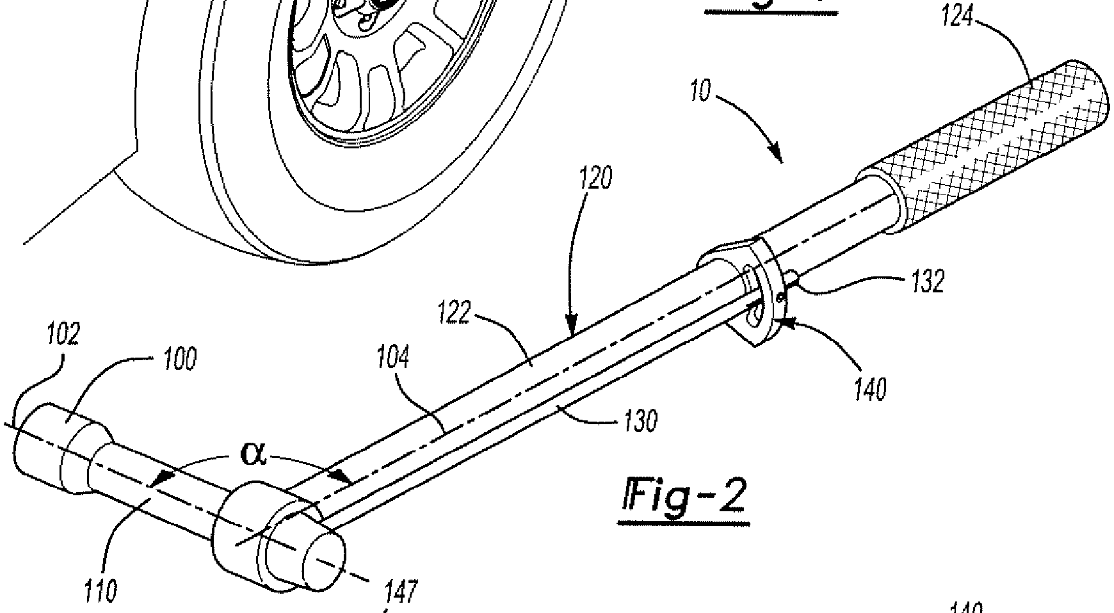
FIG. 2 is a perspective view of an embodiment of the present invention.

Referring now to FIG. 1, there is shown an embodiment of a torque setting lug nut wrench at reference numeral 10. As shown in this figure, the lug nut wrench 10 is used to tighten a lug nut A onto a motor vehicle wheel. As shown in FIG. 2, the torque setting lug nut wrench 10 includes a socket 100 and a first section 110 extending collinear from the socket 100. Projecting from the first section 110 is a second section 120. The first section 110 has an axis 102 and the second section 120 has an axis 104.

In an embodiment of the present invention, the axis 102 of the first section 110 and the axis 104 of the second section 120 form an angle a greater than 15 degrees and less than 165 degrees. In another embodiment, the second section 120 extends from the first section 110 at an angle a greater than 45 degrees and less than 135 degrees. In yet another embodiment, the second section 120 extends from the first section 110 at an angle a greater than 85 degrees and less than 130 degrees. For example, the angle $\alpha$ between the axis 102 and the axis 104 could be between 80 degrees and 100 degrees, generally forming a lug nut wrench with a second section 120 projecting at 90 degrees from the first section 110. In the alternative, the angle $\alpha$ between the axis 102 and the axis 104 could be between 110 degrees and 130 degrees, generally forming a lug nut wrench with a second section 120 projecting 120 degrees from the first section 110.

The second section 120 has a lever arm 122 with a handle 124. The user can grasp the handle 124, place the socket 100 onto the lug nut A, and by exerting pressure onto the handle 124 apply a rotational force to the lug nut. Although not shown in the figures, a prying tip used to remove hubcaps and/or wheel covers can be included on the second section 120.

A torque indicating lever 130 can be included which extends from the first section 110 in a generally parallel direction as the second section 120 and also extends at least partially through a lever binding mechanism 140. The lever binding mechanism 140 is attached to the second section 120 and can include a collar region 142 that encircles the lever arm 122. In the alternative, the binding mechanism 140 does not require a collar region 142 to attach to the second section 120 and can use any type of fastener mechanism, illustratively including screws, adhesives, welding and the like.

Figure 3:
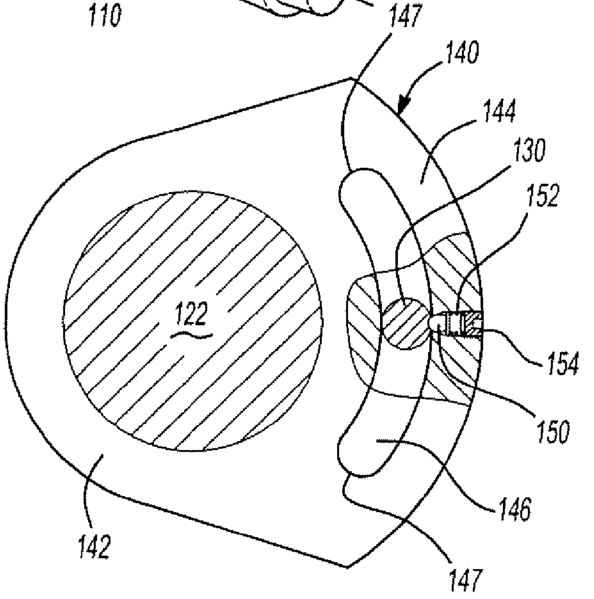
FIG. 3 is a cross-sectional view of the embodiment shown in FIG. 2.

In addition to the collar region 142, an outer region 144 affords for a slot region 146 through which the torque indicating lever 130 can extend therethrough. As shown in FIG. 3, within the outer region 144, a ball detent 150, tension spring 152 and set screw 154 can be included. The ball detent 150 and tension spring 152 afford for a binding force to be exerted onto the torque indicating lever 130. The binding force exerted onto the torque indicating lever 130 can be proportional to a desired preset torque limit to be applied to the lug nut A.

The torque indicating lever 130 can include a groove 132 that is dimensioned such that the ball detent 150 can fit at least partially within. Adjusting the set screw 154 can vary the amount of binding force applied to the torque indicating lever 130. In the alternative, the set screw 154 can be positioned by the manufacturer of the torque setting lug nut wrench 10 with the possibility of adjusting the set screw 154 not provided. In this manner, a single preset torque setting can be applied to the lug wrench 10.

Upon operation of the lug wrench 10, application of a rotational force onto a lug nut wrench affords for the elastic bending of the lever arm 122. The torque indicating lever 13O, being independent of the second section 120, has no applied strain from the rotational force and therefore seeks to extend linearly and not bend. However, the binding mechanism 140, by applying the binding force on the lever 130, holds the lever 130 in place and thereby places the lever 130 under a bending stress as it seeks to escape out from under the ball detent 150 and extend linearly. The torque indicating lever 130 continues to be strained until the bending force experienced by the lever 130 is greater than the binding force applied by the ball detent 150 and tension spring 152, at which point the torque indicating lever 130 will escape out from under the ball detent 150.

Figure 4:
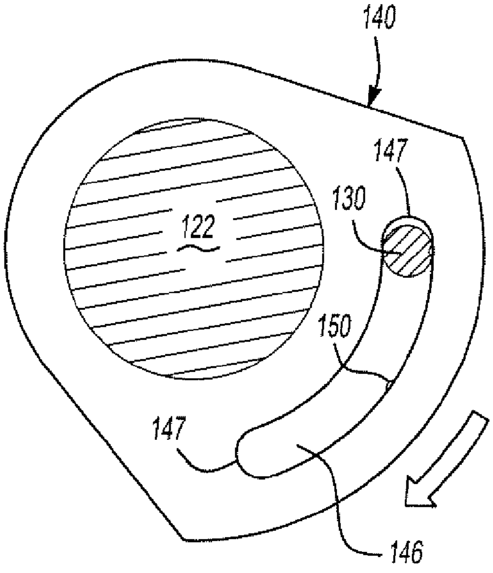
FIG. 4 is a cross-sectional view of the embodiment shown in FIG. 2 wherein a torque indicating lever is in a different position than in FIG. 3.

The lug nut wrench 10 can be preset and/or calibrated such that the point of escape of the torque indicating lever 130 out from under the ball detent 150 is equivalent to a desired amount of torque applied to the lug nut A. In the alternative, the point of escape can be preset and/or calibrated to be equivalent to a range of torque applied to the lug nut A. After the torque indicating lever 130 escapes out from under the ball detent 150, the lever 130 can move along the slot region 146 and contact an end surface 147 as illustrated in FIG. 4. The contact between the torque indicating lever 130 and the end surface 147 of slot region 146 can produce a clicking sound and thereby signal the user that the preset amount of torque has been applied to the lug nut. It is appreciated that other signals can be used with the present invention, illustratively including other types of sounds, a light a reading on a scaled dial face, a reading on a digital display and the like.

Figure 5:
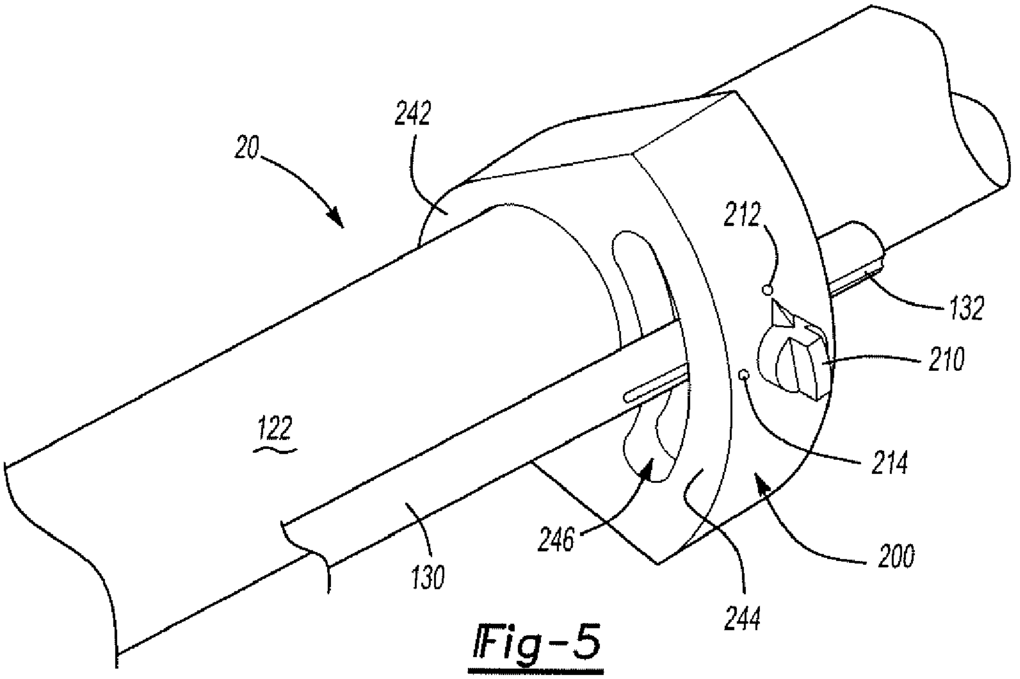
FIG. 5 is a perspective view of a different embodiment of the present invention.
Figure 6:
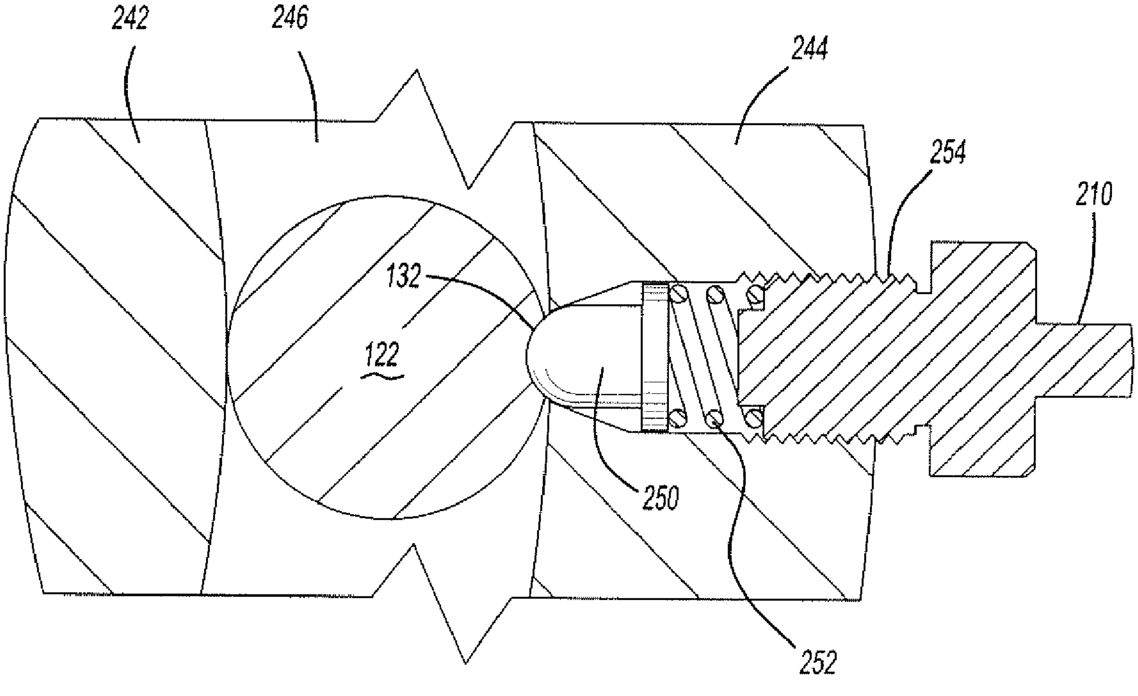
FIG. 6 is a cross-sectional view of the clicker-type mechanism shown in FIG. 5.
Figure 7:
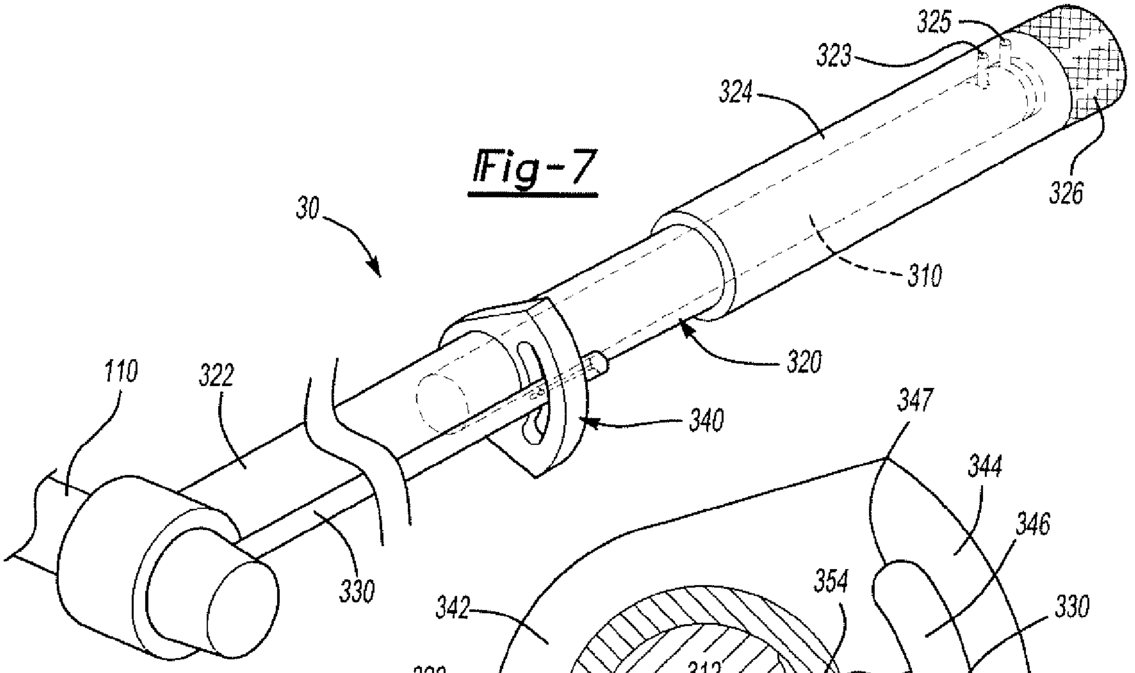
FIG. 7 is a perspective view of yet another embodiment of the present invention.
Figure 8:
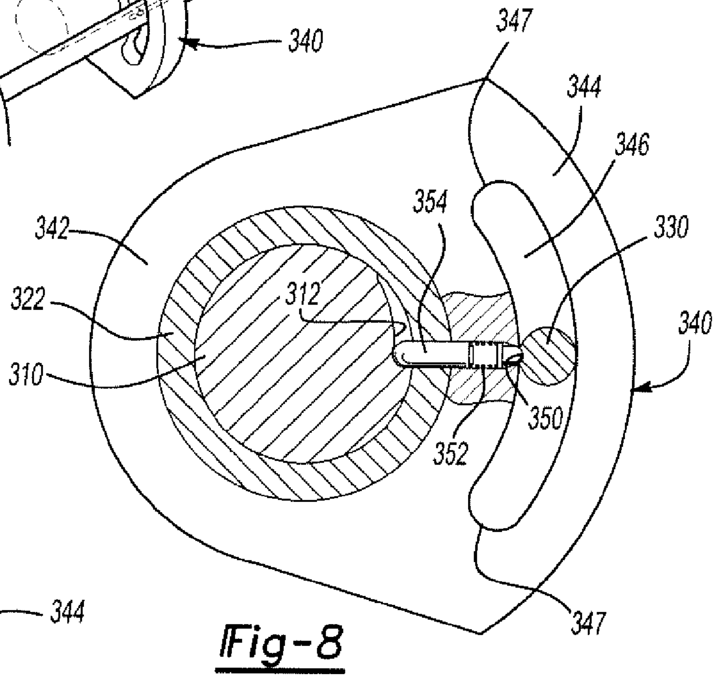
FIG. 8 is a cross-sectional view of the embodiment shown in FIG. 7.
Figure 9:
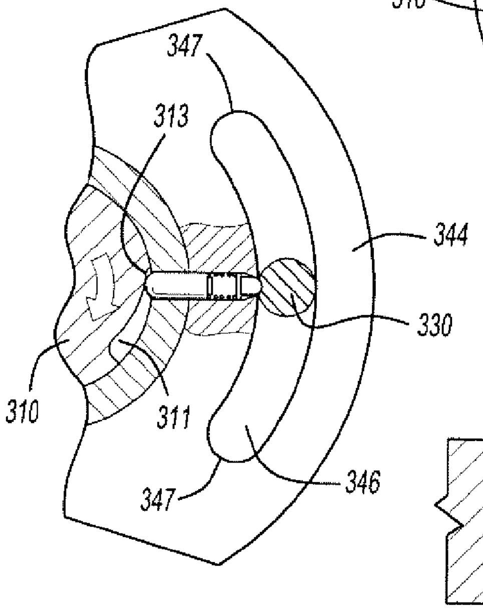
FIG. 9 is a cross-sectional view of the embodiment shown in FIG. 7.
Figure 10:
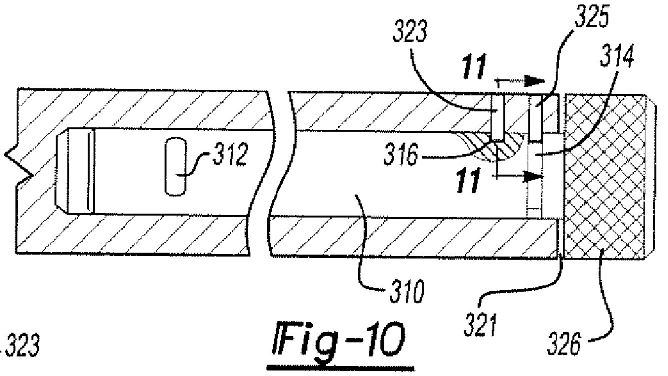
FIG. 10 is a cross-sectional view of the embodiment shown in FIG. 7.
Figure 11:
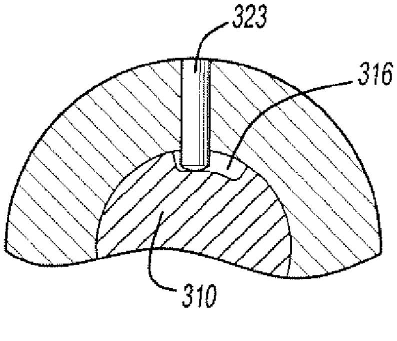
FIG. 11 is a cross-sectional view of the embodiment shown in FIG. 7.

Referring now to FIGS. 5-6, another embodiment of the present invention is shown wherein a torque setting lug nut wrench 20 has two preset torque settings. In this embodiment, a binding mechanism 200 includes a knob 210 with a first setting 212 and a second setting 214. The binding mechanism 200 has a collar region 242 and an outer region 244 with a slot region 246 therebetween. Similar to the embodiment illustrated in FIGS. 1-4, the torque indicating lever 130 has the groove 132 dimensioned such that a ball detent 250 fits at least partially within. In addition to the ball detent 250, a spring 252 and set screw 254 are operable to apply a given and desirable amount of binding force onto the torque indicating lever 130. In this manner, lug wrench 20 having two torque settings can be used to tighten a lug nut onto a motor vehicle wheel. For example, one torque setting could be used wherein the wheel is made out of aluminum and the other torque setting could be used when the wheel is made from steel.

Yet another embodiment of the present invention is illustrated in FIGS. 7-11. In this embodiment, a second section 320 extending from the first section 110 includes a lever arm 322 with a handle 324 and a torque setting rod 310. The torque setting rod 310 extends from an outer end 321 of the handle 324 into a hollow portion of the lever arm 322. The torque setting rod 310 has a torque setting groove 312, the groove 312 having a first position 311 and a second position 313. A ball detent 350, tension spring 352 and pin 354 can be included and afford for a binding force to be applied to a torque indicating lever 330. A knob 326 affords a user to turn the torque setting rod 310 from the first position 311 to the second position 313. The first position 311 affords a greater distance between the torque setting rod 310 and the torque indicating lever 330. This position affords for a fixed and preset amount of binding force to be applied to the torque indicating lever 330 and therefore a preset torque value, or a range of torque values, to be applied to a lug nut before the lever 330 escapes out from under the ball detent 350 and signal the user that such torque has been reached.

Upon turning the torque setting rod 310 to a second position 313, the distance between the rod 310 and the torque indicating lever 330 decreases a fixed amount. In this manner, the tension on the tension spring 352 increases upon the ball detent 350 and thereby exerts a greater amount of binding force on the lever 330. Therefore, a greater amount of torque applied to the lug nut A using the torque setting lug nut wrench 30 is required before the lever 330 escapes from the bail detent 350 and signals the user. In this manner, a dual setting torque lug nut wrench is provided.

As mentioned earlier and as illustrated in FIGS. 10-11, the torque setting groove 312 is within the torque setting rod 310. In addition, a placement groove 314 and placement pin 325 can be included in order to keep the rod 310 in a proper placement with respect to the lever 322 and handle 324. Although not required, a second groove 316 and second pin 323 can be used to afford for rotational stops of the rod 310 associated with the first position 311 and second position 313.

Although the embodiments described thus far illustrate the use of a beam-type and clicker-type torque indicating mechanism, other types of torque wrench mechanisms can be used within the scope of the present invention, illustratively including a calibrated clutch mechanism, leaf spring element type mechanism and the like. In addition, the torque setting lug nut wrench of the present invention can use a light, sound and/or change of color to signal the user that a preset torque value or range of torque values, has been applied to a lug nut.

The preset torque limit in one example of the present invention is between 100 and 150 newton-meters (N·m). In another example, the preset torque limit can be between 110 and 140 N·m. And yet in another example the preset torque limit can be between 120 and 130 N·m. A torque setting lug nut wrench with this range of preset torque limits can be used to tighten a lug nut on a wheel made from an aluminum and/or aluminum alloy. In the alternative, one example of the present invention can include a preset torque limit between 190 and 240 N·m. The present invention can also include a preset torque limit between 200 and 230 N·m, and in the alternative a preset torque limit between 205 and 215 N·m. This higher range of preset torque limits can be used to tighten a lug nut on a wheel made from steel or stainless steel.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

I claim:

1. A torque setting lug nut wrench comprising:

a socket, said socket dimensioned to fit a lug nut of a motor vehicle wheel;

a first section extending collinearly from said socket;

a second section projecting from said first section at an angle greater than 15 degrees and less than 165 degrees, said second section operable to apply a rotational force on the lug nut of the motor vehicle wheel when the lug nut is within said socket; and a clicker-type torque detection mechanism attached to said second section and having a preset torque limit, said clicker-type torque detection mechanism having a torque indicating lever and a binding force mechanism having a slot region, a tension spring and a ball detent, said tension spring in contact with said ball detent;

said torque indicating lever extending at least partially through said slot region and said ball detent in contact with said torque indicating lever and operable to provide a signal to a user applying a rotational force to the lug nut within said socket when said preset torque limit has been applied to the lug nut.

2. The invention of claim 1, wherein said binding force mechanism has a set screw in contact with said tension spring.

3. The invention of claim 2, wherein said set screw has a single setting proportional to said preset torque limit.

4. The invention of claim 2, wherein said set screw has a first setting and a second setting, said first setting proportional to a first preset torque limit and said second setting proportional to a second preset torque limit.

5. The invention of claim 4, wherein said first preset torque limit is between 100 and 150 newton·meters and said second preset torque limit is between 190 and 240 newton·meters.

6. The invention of claim 1, wherein said torque indicating lever is operable to move from a position in contact with said ball detent to an end surface of said slot region.

7. The invention of claim 6, wherein said torque indicating lever moves from said position in contact with said ball detent to said end surface of said slot region when said preset torque limit is applied to the lug nut within said socket.

8. The invention of claim 1, further comprising a third section projecting from said first section, said third section operable to be held by a user to prevent said socket of said lug wrench from slipping off of the nut while applying a rotational force to the lug nut.

9. The invention of claim 1, wherein said preset torque limit is between 100 and 150 newton·meters.

10. The invention of claim 1, wherein said preset torque limit is between 190 and 240 newton·meters.

11. The invention of claim 1, wherein said signal is selected from the group consisting of a sound, a light, a reading on a dial and a reading on a digital display.

12. A torque setting lug nut wrench for use with a motor vehicle having a rim secured to a wheel by a plurality of lug nuts tightened to a preset torque limit, comprising:

a socket, said socket dimensioned to receive the lug nut of the motor vehicle wheel;

a first section extending collinearly from said socket;

a second section projecting from said first section and operable to apply a rotational force on the lug nut when the lug nut is within said socket;

a torque indicating lever projecting from said first section generally parallel with said second section; and a binding force mechanism attached to said second section and having a slot region, a set screw, a tension spring and a ball detent;

said torque indicating lever extending at least partially through said slot region of said binding force mechanism;

said ball detent in contact with said torque indicating lever and operable to bind said torque indicating lever in a fixed location until said preset torque limit is applied to the lug nut within said socket.

13. The invention of claim 12, wherein said binding force mechanism has a binding force setting proportional to the preset torque limit applied to the lug nut, said binding force setting selected from the group consisting of a setting proportional to the preset torque limit between 100 and 150 newton·meters and a setting proportional to the preset torque limit between 190 and 240 newton·meters.

14. A torque setting lug nut wrench comprising:

a socket, said socket dimensioned to fit onto a lug nut of a motor vehicle wheel;

a first section extending collinearly from said socket;

a second section projecting from said first section at an angle greater than 15 degrees and less than 165 degrees, said second section operable to apply a rotational force on the lug nut when the lug nut is within said socket;

a torque indicating lever projecting from said first section generally parallel with said second section;

a binding force mechanism having a slot region, said binding force mechanism attached to said second section; and a ball detent in communication with said slot region;

said torque indicating lever extending at least partially through said slot region of said binding force mechanism;

said ball detent operable to bind said torque indicating lever in a fixed location until a preset torque limit is applied to the lug nut within said socket.

* * * * *